US011008427B2

(12) United States Patent
Shin et al.

(10) Patent No.: US 11,008,427 B2
(45) Date of Patent: May 18, 2021

(54) METHOD FOR PREPARING NON-ACID-TREATED ECO-FRIENDLY CELLULOSE NANOCRYSTAL, AND CELLULOSE NANOCRYSTAL PREPARED THEREBY

(71) Applicant: Korea Research Institute of Chemical Technology, Daejeon (KR)

(72) Inventors: Jihoon Shin, Daejeon (KR); Yeong Un Kim, Daejeon (KR); Min Woo Lee, Gyeryong-si (KR); Bong Keun Song, Daejeon (KR)

(73) Assignee: Korea Research Institute of Chemical Technology, Daejeon (KR)

(*) Notice: Subject to any disclaimer, the term of this patent is extended or adjusted under 35 U.S.C. 154(b) by 0 days.

(21) Appl. No.: 16/138,752

(22) Filed: Sep. 21, 2018

(65) Prior Publication Data
US 2019/0023857 A1   Jan. 24, 2019

Related U.S. Application Data

(63) Continuation of application No. PCT/KR2017/003225, filed on Mar. 24, 2017.

(30) Foreign Application Priority Data

Mar. 29, 2016 (KR) .................. 10-2016-0037936
Mar. 24, 2017 (KR) .................. 10-2017-0037943

(51) Int. Cl.
*B01J 19/08*   (2006.01)
*B01J 19/12*   (2006.01)
(Continued)

(52) U.S. Cl.
CPC ............... *C08J 3/14* (2013.01); *B01J 19/081* (2013.01); *B01J 19/082* (2013.01); *B01J 19/085* (2013.01);
(Continued)

(58) Field of Classification Search
CPC ... C08J 3/14; C08J 3/12; C08J 2301/02; B01J 19/081; B01J 19/082; B01J 19/125;
(Continued)

(56) References Cited

U.S. PATENT DOCUMENTS 9,587,258 B2 *   3/2017   Medoff .................. B01D 39/18
2010/0124583 A1 *   5/2010   Medoff .................. B01D 39/18
                                                            426/2
(Continued)

FOREIGN PATENT DOCUMENTS

KR        10 1239885        3/2013
KR    10 2016 0019753        2/2016

OTHER PUBLICATIONS

Translation of the written opinion in PCT/KR2017/003225, dated May 22, 2017 (Year: 2017).*
(Continued)

*Primary Examiner* — Nicholas A Smith
*Assistant Examiner* — Colleen M Raphael
(74) *Attorney, Agent, or Firm* — Leydig, Voit & Mayer, Ltd.

(57) ABSTRACT

The present invention relates to a method for preparing a non-acid-treated eco friendly cellulose nanocrystal and the cellulose nanocrystals prepared by the same. The methods for preparing the non-acid-treated cellulose nanocrystal and extracting the cellulose nanocrystal from cellulosic materials of the present invention are eco-friendly methods, compared with the conventional preparation method for cellulose nanocrystal based on acid-hydrolysis; are efficient due to the total energy saving process; are easy to utilize side products; and are characterized by high yield to produce the target cellulose nanocrystal. The nanocrystal prepared according to the present invention exhibits equivalent or higher aspect ratio, yield and crystallinity than the cellulose (Continued)

nanocrystal prepared through acid hydrolysis, and has remarkably excellent thermal stability, so that it can be effectively used for the production of membranes, electrical and electronic parts, substrates, heat insulating materials, and reinforcing materials required for durability against heat.

8 Claims, 6 Drawing Sheets

(51) Int. Cl.
| | |
|---|---|
| *C08B 15/02* | (2006.01) |
| *C08B 15/08* | (2006.01) |
| *C08H 8/00* | (2010.01) |
| *C08B 1/00* | (2006.01) |
| *B02C 19/00* | (2006.01) |
| *C08J 3/14* | (2006.01) |

(52) U.S. Cl.
CPC .......... *B01J 19/123* (2013.01); *B01J 19/125* (2013.01); *C08B 1/003* (2013.01); *C08B 15/02* (2013.01); *C08B 15/08* (2013.01); *C08H 8/00* (2013.01); *B02C 19/005* (2013.01); *C08J 2301/02* (2013.01)

(58) Field of Classification Search
CPC ....... B01J 19/085; B01J 19/123; C08B 1/003; C08B 15/02; C08B 15/08; C08B 1/00; C08B 1/02; C08H 8/00; B02C 19/005; B02C 19/18; B02C 2019/183
USPC ........................ 204/157.87, 157.63–157.65
See application file for complete search history.

(56) References Cited

U.S. PATENT DOCUMENTS

| | | | | |
|---|---|---|---|---|
| 2010/0279019 A1* | 11/2010 | Beck | ............... | C09K 19/542 427/384 |
| 2012/0316330 A1* | 12/2012 | Zhu | ............... | C08H 8/00 536/56 |
| 2013/0273612 A1* | 10/2013 | Medoff | ............... | C10G 3/00 435/99 |
| 2015/0017432 A1* | 1/2015 | Shoseyov | ............... | B82Y 30/00 428/336 |
| 2015/0158955 A1* | 6/2015 | Graveson | ............... | C08B 15/02 162/76 |
| 2015/0232703 A1* | 8/2015 | Nelson | ............... | C09D 197/005 435/99 |
| 2015/0368368 A1* | 12/2015 | Retsina | ............... | C08B 15/00 106/203.2 |
| 2015/0368441 A1* | 12/2015 | Retsina | ............... | C08L 1/02 442/59 |
| 2016/0010275 A1* | 1/2016 | Minko | ............... | D06P 1/0052 8/445 |
| 2016/0168272 A1* | 6/2016 | Retsina | ............... | C08B 15/02 162/9 |
| 2016/0168343 A1* | 6/2016 | Retsina | ............... | D01C 1/00 106/163.01 |
| 2016/0168363 A1* | 6/2016 | Nelson | ............... | D21C 9/007 428/35.7 |
| 2016/0200934 A1* | 7/2016 | Meredith, III | ....... | C09D 163/00 427/386 |
| 2017/0015822 A1* | 1/2017 | Nelson | ............... | D21H 21/18 |
| 2017/0058127 A1* | 3/2017 | Naduvile Veettil | ....... | C09C 1/48 |
| 2017/0275385 A1* | 9/2017 | Capanema | ............ | C08L 97/005 |
| 2017/0306055 A1* | 10/2017 | Fan | ............... | D21C 9/002 |
| 2018/0016355 A1* | 1/2018 | Nelson | ............... | C08H 8/00 |
| 2018/0251941 A1* | 9/2018 | Nelson | ............... | C08B 15/08 |
| 2019/0062998 A1* | 2/2019 | Chen | ............... | D21H 17/35 |

OTHER PUBLICATIONS

Machine translation of the description of KR20160019753, downloaded on Oct. 1, 2019 (Year: 2019).*
Rambabu et al, "Production of nanocellulose fibers from pinecone biomass: Evaluation and optimization of chemical and mechanical treatment conditions on mechanical properties of nanocellulose film," Industrial Crops and Products 83 (2016) 746-754 (Year: 2016).*
Sosiati et al, "Morphology and crystallinity of sisal nanocellulose after sonication," AIP Conference Proceedings 1877, 030003 (2017); https://doi.org/10.1063/1.4999859 (Year: 2017).*
Search Report dated May 22, 2017, corresponding to International Application No. PCT/KR2017/003225 (filed Mar. 24, 2017), a related application, 10 pp.
Dong et al. (1998) "Effect of Microcrystallite Preparation Conditions on the Formation of Colloid Crystals of Cellulose," Cellulose 5:19-32.
Driscoll et al. (2009) "Electron Beam Irradiation of Cellulose," Radiation Physics and Chemistry 78:539-542.
Kargarzadeh et al. (2012) "Effects of Hydrolysis Conditions on the Morphology, Crystallinity, and Thermal Stability of Cellulose Nanocrystals Extracted from Kenaf Bast Fibers," Cellulose 19:855-866.
Lee et al. (2018) "Facile and Eco-friendly Extraction of Cellulose Nanocrystals via Electron Beam Irradiation Followed by High-Pressure Homogenization" Green Chemistry 20(11):2596-2610.
"Roadmap for the Development of International Standards for Nanocellulose," Oct. 24, 2011, TAPPI, 36 pp.

* cited by examiner

METHOD FOR PREPARING NON-ACID-TREATED ECO-FRIENDLY CELLULOSE NANOCRYSTAL, AND CELLULOSE NANOCRYSTAL PREPARED THEREBY

CROSS-REFERENCE TO RELATED APPLICATIONS

This application is a U.S. Continuation Application filed under 35 U.S.C. § 111(a) which claims the benefit of International Application No. PCT/KR2017/003225, filed Mar. 24, 2017, which claims the benefit of Korean Application No. 10-2016-0037936, filed Mar. 29, 2016, and which claims the benefit of Korean Application No. 10-2017-0037943, filed Mar. 24, 2017. Each of these applications are hereby incorporated by reference in their entireties.

BACKGROUND OF THE INVENTION

1. Field of the Invention

The present invention relates to a method for preparing a non-acid-treated eco-friendly cellulose nanocrystal and the cellulose nanocrystal prepared by the same.

2. Description of the Related Art

Cellulose nanomaterials obtained from cellulose, which is the most abundant polymeric material available in nature, have advantages in recyclability, biodegradability, biocompatibility, high mechanical strength and elastic modulus, high surface area and easy chemical modification, because of which the cellulose nanomaterials are key factors of NT (Nanotechnology), one of the three core technologies of science and technology.

Cellulose nanomaterials are usually classified as nanofibrillated cellulose and cellulose nanocrystal according to the preparation method. Such preparation method includes a typical high-energy physical treatment method, a method using an inorganic acid, an alkali or an enzyme, or a combination thereof. Pre-treatment can also be performed with a combination of the above methods to reduce the energy consumption of the high-energy physical treatment. The characteristics of the cellulose nanomaterials prepared by the methods explained above might be varied according to the preparation procedure and the shape.

Cellulose is composed of a continuous bond of two glucoses, cellobiose, linked by β-(1-4) bond. The number of bonds is denoted by the degree of polymerization (DP). In the natural world, DP of cellulose is about 10,000 to 15,000 depending on the type. The degree of polymerization is related to the length of cellulose chain, and the cellulose chains are gathered to form one structure in the cell wall, which is called elementary fibril. Elementary fibrils are the smallest cellulose nanomaterials that can be physically or chemically isolated, with a width of about 4-5 nm. Elementary fibrils are arranged and clustered spirally with respect to the axial direction to form microfibrils. A portion between the microfibrils or the chain is an amorphous region. When cellulose is hydrolyzed by acid, the hydrolysis rate of the amorphous region is much faster than that of the crystalline region. Therefore, hydrolysis of the cellulose under proper conditions can result in cellulose nanocrystal in the form of hair mainly composed of the crystalline region. The cellulose nanocrystal has an elastic modulus of about 150 GPa and are excellent in acid resistance, so it can be used as a composite material and a composite material for medical engineering.

Because of the economical merits and the excellent water-dispersibility of cellulose nanocrystal, the cellulose nanocrystal is produced by using sulfuric acid. In the mass-preparation of cellulose nanocrystal, high risk in the process using a high concentration of sulfuric acid, difficulty of separation and washing after hydrolysis, and environmental issues caused by waste water treatment have to be considered. Further, sulfate groups attach to the surface of the cellulose nanocrystal during the hydrolysis process, which causes a serious thermal instability, resulting in the limit in the usability of the final product.

To overcome the environmental problems caused by the hydrolysis using acid and the thermal instability of the product, it is important to prepare cellulose nanocrystal providing a thermal stability to the final product through an eco-friendly method.

Therefore, in the course of study to establish a preparation method for cellulose nanocrystal without using acid, the present inventors confirmed that the cellulose nanocrystal prepared by the non-acid-treated eco-friendly cellulose nanocrystal according to the method of the present invention have excellent yield, crystallinity, aspect ratio and thermal stability, compared with the cellulose nanocrystal prepared by the conventional hydrolysis based on sulfuric acid, leading to the completion of the present invention.

3. Non-patent References (Non-Patent Reference 1) Dong, X, M.; Revol, J. F.; Gray, D. G. *Cellulose* 1998, 5(1), 19-32.
(Non-Patent reference 2) Kargarzadeh, H.; Ahmad, I.; abdullah, I.; Dufresne, A.; Zainudin, S, Y.; Sheltami, R. M. *Cellulose* 2012, 19(3), 855-866.
(Non-Patent reference 3) Driscoll, M.; Stipanovic, A.; Winter, W.; Cheng, K.; Manning, M.; Spiese, J.; Galloway, R, A.; Cleland, M, R. *Radiation Physics and Chemistry* 2009, 78, 539-542.

SUMMARY OF THE INVENTION

It is an object of the present invention to provide a preparation method for non-acid-treated enco-friendly cellulose nanocrystal.

It is another object of the present invention to provide an extraction method of cellulose nanocrystal from cellulosic materials.

It is also an object of the present invention to provide cellulose nanocrystal prepared by the preparation method above.

To achieve the above objects, the present invention provides a method for preparing a non-acid-treated eco-friendly cellulose nanocrystal comprising the following steps:
  irradiating cellulosic materials with radiation (step 1); and
  homogenizing the irradiated cellulosic materials from step 1 (step 2).

The present invention also provides an extraction method of cellulose nanocrystal from cellulosic materials comprising the following steps:
  irradiating cellulosic materials with radiation (step 1); and
  homogenizing the irradiated cellulosic materials in step 1 (step 2).

Further, the present invention provides cellulose nanocrystals prepared by the preparation method for non-acid-treated eco-friendly cellulose nanocrystal above.

Advantageous Effect

The preparation method for non-acid-treated cellulose nanocrystal and the extraction method of the cellulose nanocrystal from cellulosic materials of the present invention are eco-friendly methods, compared with the conventional preparation method for cellulose nanocrystal based on acid-hydrolysis; are efficient due to the total energy saving process; are easy to utilize side products; and are characterized by high yield to produce the target cellulose nanocrystal. The nanocrystal prepared according to the present invention exhibits equivalent or higher aspect ratio, yield and crystallinity than the cellulose nanocrystal prepared through acid hydrolysis, and have remarkably excellent thermal stability, so that the nanocrystal can be effectively used for the production of membranes, electrical and electronic parts, substrates, heat insulating materials, and reinforcing materials required for durability against heat.

BRIEF DESCRIPTION OF THE DRAWINGS

The application of the preferred embodiments of the present invention is best understood with reference to the accompanying drawings, wherein.

DETAILED DESCRIPTION OF THE INVENTION

Figure 1:
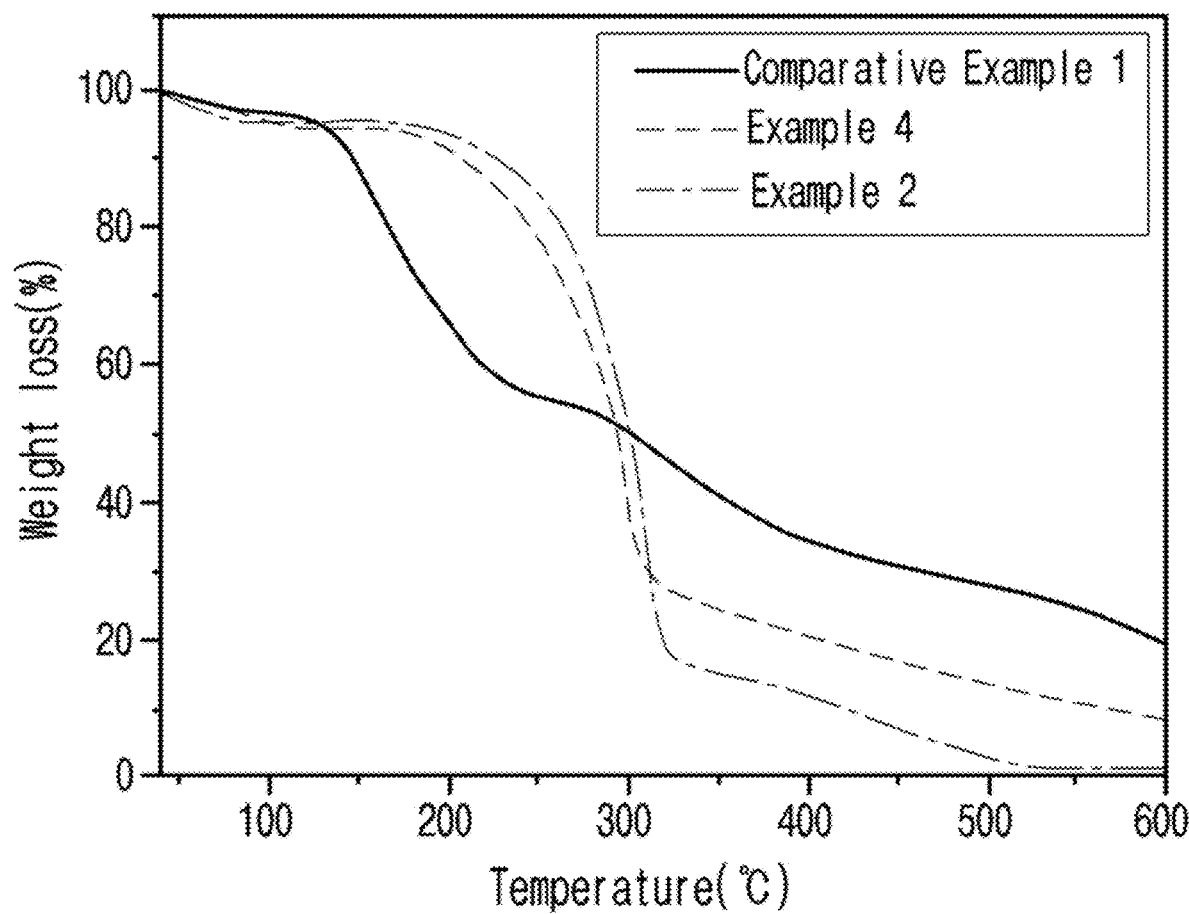
FIG. 1 is a graph illustrating the results of thermogravimetric analysis with the cellulose nanocrystals prepared in comparative example 1 and examples 2 and 4 according to the present invention.

Hereinafter, the present invention is described in detail. The present invention provides a method for the preparation of a non-acid-treated eco-friendly cellulose nanocrystal comprising the following steps:
irradiating cellulosic materials with radiation (step 1); and
homogenizing the irradiated cellulosic materials in step 1 (step 2).

Hereinafter, the preparation method for a non-acid-treated eco-friendly cellulose nanocrystal is described in more detail. In the preparation method for the non-acid-treated eco-friendly cellulose nanocrystal, step 1 is to irradiate cellulosic materials.

Herein, the cellulosic materials indicate cellulose wherein the crystalline region and the amorphous region stay together, which is shaped by the following morphology but not limited thereto.

Currently, nanocellulose is defined as a cellulose-based material having a length or width of 100 nm or less based on ISO-TC 229. The criteria to distinguish cellulose nanofibers (CNFs) from cellulose nanocrystals (CNCs) are not clearly defined up to date, yet considering the discussion for the standardization, it is necessary to define terms of nanocellulose according to aspect ratio, surface charge, degree of polymerization and degree of crystallization (Roadmap for the Development of International Standards for Nanocellulose, TAPPI, 2011). In general, the aspect ratio of nanofiber is 30~200 and the aspect ratio of nanocrystal is 5~25.

As for the cellulosic materials according to the present invention, cellulose sources such as microcrystalline cellulose, microbial cellulose, cellulose derived from marine or invertebrate animals, mechanical pulp, thermomechanical pulp or wood pulp including chemical pulp, non-wood pulp including cotton, yam, kenaf, bamboo, etc., regenerated cellulose prepared by dissolving cellulose and mercerised cellulose, cellulose derivatives using the above cellulosic materials, and cellulose derivatives such as carboxymethyl cellulose (CMC), TEMPO-oxidized cellulose, ethyl cellulose, and substances which can be further derivatized to sulfation or esterification can be used.

Preferably, the cellulosic materials can be primarily wood pulp or the fabric or fiber composed of microcrystalline cellulose or natural cellulose derived therefrom.

The preferable form of the cellulosic material is not particularly limited, but it is in the form of a sheet, a fabric, a board, or the one regulated with its thickness of up to 5 mm by spreading pellet or powder widely, considering that the density of cellulose is about 1.5 $g/m^3$. This is to ensure that the radiation is completely transmitted through the cellulosic material and is uniformly irradiated.

The radiation of step 1 is not particularly limited, but is preferably selected from the group consisting of electron beam, alpha ray, beta ray, gamma ray, ultraviolet ray, X-ray, plasma and a combination thereof. More preferably, electron beam can be used.

The electron beam is a bundle of electrons having a constant energy. A relatively low acceleration voltage is obtained from a rectifying tube. In order to obtain a high energy electron beam, an electron accelerator is used.

The preferable dosage of the radiation is 500~2,500 kGy. The preferable dosage range above is proposed after considering the costs, energy and yield in the process of extracting nanocrystals from cellulosic materials.

If the irradiation dosage is less than 500 kGy, the cellulose chain for extracting nanocrystals is not sufficiently cleaved and the non-crystalline region is not sufficiently weakened, so that the homogenization process must be performed longer or the yield of the final nanocrystal product may be reduced. In the meantime, if the irradiation dosage is higher than 2,500 kGy, even the crystalline region of cellulose can be weakened and thus the amount of the low molecular cellulosic materials to be eliminated by hot water extraction can also be increased, leading to the decrease of the yield of the final nanocrystal product.

In the preparation method for a non-acid-treated eco-friendly cellulose nanocrystals of the present invention, the yield and the characteristics of cellulose nanocrystals were evaluated according to the irradiation dosage. As a result, it was confirmed that the yield of nanocrystals decreased with increasing the irradiation dosage. In particular, when the irradiation dosage was 3000 kGy, the yield was as low as upto 29% (see Experimental Example 4 and Table 3).

In example 6 wherein 3000 kGy of electron beam was irradiated, the degree of polymerization and size were remarkably reduced compared to the products of example 1-5, and the highest transmittance was confirmed. From the investigation of the aspect ratio and the size according to the irradiation at the dosage of 3000 kGy, it was concluded that not only the amorphous region of cellulose but also the entire cellulose were destroyed.

In the meantime, in examples 1-5, the degree of polymerization was up to 100 and the aspect ratio was 7~25. The length of the product was at least 200 nm. From the results above, it was confirmed that the amorphous region was destroyed by the irradiation of electron beam, but the cellulose nanocrystals remained in the form. In examples 1-5, since the degree of polymerization was up to 100 and the aspect ratio was 5~25, the general requirement of nanocrystal was satisfied (see Experimental Example 6 and Table 5).

Further, the cellulose nanocrystals prepared in examples 16~21 displayed the degree of polymerization of the pulp sheet up to 100, suggesting that the target cellulose nanocrystals of the present invention were successfully prepared with desired transparency. However, when electron beam was irradiated at the dosage of 100 and 200 kGy in example 8 and example 9, the degree of polymerization was at least 100 and the amorphous region of cellulose was not destroyed, so that the target cellulose became unclear opaque solution phase (see Experimental Example 6 and FIG. 4).

In order to prepare the cellulose nanocrystals as wanted in the present invention, electron beam was preferably irradiated at the dosage of 500~2500 kGy.

Therefore, it was confirmed that the preferable irradiation dosage in the preparation method for non-acid-treated eco-friendly cellulose nanocrystals according to the present invention was 500~2500 kGy.

In the preparation method for non-acid-treated eco-friendly cellulose nanocrystals of the present invention, the purpose of the irradiation in step 1 is to induce chain scission in the cellulose by weakening the glucosidic bond formed between glucose units by the radicals generated by irradiating the cellulosic materials and also to separate the amorphous region which is relatively linked loosen, compared with the crystalline region, from the crystalline region.

The low molecular cellulosic materials separated by the irradiation process do not include any acid residue, unlike the conventional low molecular cellulosic materials prepared by acid hydrolysis, so that there is no difficulty in glycation and purification, resulting in a high value added byproduct.

The preparation method for non-acid-treated eco-friendly cellulose nanocrystals of the present invention can further include a step of hot water extraction after the irradiation in step 1 above.

Particularly, the step of hot water extraction is the step of pretreatment to obtain the final crystalline cellulose nanocrystal from the cellulosic materials irradiated in step 1. In this step, the low molecular material produced by the electron beam irradiation is separated to obtain undifferentiated cellulose slurry, and this process can be performed without any addition of a chemical.

The step of hot water extraction is efficient in separating the low molecular materials after obtaining cellulose slurry. The separation method is not particularly limited, but can be selected from the group consisting of filtration, centrifugation, precipitation, and a combination thereof.

Further, the temperature for the hot water extraction above is not particularly limited but is preferably 50~200° C. The range of the preferable temperature for the hot water extraction above is set by considering cost, energy and yield in the course of extraction of nanocrystals from cellulosic materials.

If the hot water extraction is performed at a higher temperature than the range above, it is difficult to extract the low molecular cellulosic materials without damage of the crystalline region in the target cellulose. In particular, when the hot water extraction is performed at a higher temperature than 200° C., hydrolysis is induced by such a high temperature and thus the crystalline region in the cellulose becomes weak, resulting in the decrease of yield of the final nanocrystal.

In the hot water extraction step, since pH of the pulp sheet oxidized by irradiation is acidic (about pH 3.2), a step of adding a small amount of caustic soda or ammonia water to adjust the pH to neutral or weak alkali can be included. The purpose of this step is to make the dissociation of microfibrils easy by inducing swelling fully in the inside of the pulp.

In the preparation method for non-acid-treated eco-friendly cellulose nanocrystal of the present invention, the yield of cellulose nanocrystal was evaluated according to the solution conditions in the hot water extraction step. As a result, it was confirmed that using an alkali solution gives a similar or a little higher yield than using pure water in the hot water extraction of cellulose nanocrystals (see Experimental Example 5 and Table 4).

Further, an additional step of bleaching using an oxidizing agent or a reducing agent can be included. That is, the step of hot water extraction can additionally include an additional step of bleaching using an oxidizing agent or a reducing agent. The oxidizing agent herein can be one or more compounds selected from the group consisting of hydrogen peroxide, ozone, sodium chlorite, chlorine dioxide, and sodium hypochlorite, but not always limited thereto. The reducing agent herein can be one or more compounds selected from the group consisting of sodium hydrogen sulfite, hydrosulfide, sulfurous acid gas, sodium sulfite and sodium thiosulfate, but not always limited thereto.

Preferably, the bleaching process can be performed using one of the oxidizing agents or reducing agents listed above at the temperature up to 100° C. for up to 5 hours once or more.

According to the present invention, the bleaching process of the present invention can solve the problem of yellowing phenomenon of cellulose which might be caused by irradiation or alkali treatment.

In the preparation method for non-acid-treated eco-friendly cellulose nanocrystal of the present invention, step 2 is the step of homogenization of the cellulosic materials irradiated in step 1.

Particularly, step 2 is to induce nanoization and dispersion to obtain cellulose nanocrystal through homogenization. The purpose of this step is to separate the crystalline cellulose and to disperse the crystalline cellulose in the aqueous system.

At this time, the said homogenization is a method of dispersing each component of a heterogeneous mixture as fine particles, which is exemplified by mechanical treatment and chemical treatment. The structure and shape of the cellulose fiber can be varied from the treatment method, either mechanical treatment or chemical treatment.

The homogenization in step 2 of the present invention can be accomplished by mechanical treatment, but not always limited thereto.

At this time, the mechanical treatment can be performed by using one of those instruments selected from the group consisting of a grinder, a mill, a homogenizer, a sonicator, a fluoridizer, and a combination thereof, but not always limited thereto. Preferably in this invention, a homogenizer or a fluoridizer is preferably used. More preferably, a homogenizer can be used.

As the homogenizer, a high pressure homogenizer was used, and impact force, shearing force, cavitation, and the like, which occur when is passed through a high-pressure, can be nano-have.

The homogenizer herein was the high pressure homogenizer, which facilitates nanoization of cellulose by impact force, shearing force, and cavitation generated when the water-dispersed cellulose passes through a high pressure fine nozzle.

The driving range of a processing apparatus in the form of the high pressure homogenizer is 4,000~45,000 psi and more preferably 20,000~40,000 psi in order to accomplish the purpose of the present invention.

If the driving range is less than 4,000 psi, the times of homogenization increases, indicating the efficiency decrease. If the driving range is more than 45,000 psi, the life time of the homogenizer and the driving efficiency decrease.

Particularly, the maximum hydraulic pressure of the high pressure homogenizer being used today is 50,000 psi. Therefore, trying to increase the hydraulic pressure to the maximum hydraulic pressure is not desired. The shape and chemical structure of the cellulose nanocrystal prepared by using the homogenizer within the most preferable driving range of 20,000 to 40,000 psi are not changed, and the number of times of homogenization treatment is not greatly affected in carrying out the homogenization treatment.

Further, the conventional dispersion of cellulose nanocrystal based on acid hydrolysis is generally performed by using a sonicator, but it is time consuming and energy consuming and continuous operation is difficult. To overcome the problem above, a high pressure homogenizer and a micro fluidizer can be used. The instruments above have the optimum function for the separation and dispersion of the crystalline cellulose and can be operated continuously.

In the preparation method for non-acid-treated eco-friendly cellulose nanocrystal of the present invention, the production of cellulose nanocrystal according to the instrument in the homogenization step was investigated. As a result, it was confirmed that the nanoization of the cellulose nanocrystal of example 10 prepared by using a sonicator was hardly achieved even when the sonicator treatment time was increased. Therefore, it was confirmed that the preparation method for non-acid-treated eco-friendly cellulose nanocrystal of the invention is not usable when the sonicator is used instead of the high pressure homogenizer in the step of homogenization (see Experimental Example and FIG. 3).

The yield of the cellulose nanocrystal prepared by the separation and dispersion method above can be 40~60% according to the initial degree of polymerization of the cellulosic materials and the treatment condition of electron beam, which is an increased yield from the conventional yield of 30~40% of the cellulose nanocrystal prepared by the conventional acid hydrolysis.

One of the differences between the preparation method for non-acid-treated eco-friendly cellulose nanocrystal of the present invention and the conventional preparation method for cellulose nanocrystal based on acid hydrolysis is the step of irradiation in order to oxidize cellulosic materials.

In the conventional method using acid hydrolysis, the acid can be selected from the group consisting of sulfuric acid, phosphoric acid, nitric acid, hydrochloric acid, and a combination thereof. The acids above can be diluted in an aqueous solution before use. In the course of acid hydrolysis of cellulose, the concentration of acid, temperature and reaction time can be varied, which results in different yield and shape of the final cellulose nanocrystal product.

In the manufacturing process using acid, the process of removing acid decomposition products and residual acids after the reaction is very difficult, takes a long time, or requires a large amount of washing solution. Usually, a high concentration (at least 50%) of acid is used, so that the durability of the instruments used for acid hydrolysis such as reactor, stirrer and other devices for acid hydrolysis has to be considered. In addition to careful operation, waste water recycling and side products of reaction are also limited. In particular, the acid group remaining on the surface of the final cellulose nanocrystal reduces thermo-stability, compared with the primary cellulosic materials.

As described hereinbefore, in the conventional acid hydrolysis based method, the operation is carried out taking into account the effect of temperature and time using a high concentration of acid. On the contrary, the irradiation step of the preparation method for non-acid-treated eco-friendly cellulose nanocrystal of the present invention requires a short treatment time of several seconds to several tens of seconds, does not display any residual toxicity, does not require chemical materials such as acid, can be accomplished at room temperature, is not limited in water use, and facilitates massive treatment.

In the conventional method, filtering, centrifugation or osmotic dialysis is performed in order to eliminate the remaining acid after acid hydrolysis, indicating the method is not efficient time-wise or energy-wise. However, the preparation method of the present invention is advantageous in washing and separation after hot water extraction simply without any addition of chemicals.

Therefore, the preparation method for non-acid-treated eco-friendly cellulose nanocrystal of the present invention is more excellent in pro-environmental aspect and energy saving than the conventional method and also is advantageous for mass-production, indicating the method of the present invention is efficient for the production of cellulose nanocrystal.

The degree of crystallization of the cellulose nanocrystal prepared by the preparation method for non-acid-treated eco-friendly cellulose nanocrystal of the present invention was evaluated. As a result, the cellulose nanocrystal irradiated according to the method of the invention above displayed a similar or higher degree of crystallization than the initial cellulosic materials (see Experimental Example 2, FIG. 2, and Table 2).

As a result of evaluating the of the cellulose nanocrystal in the method of producing the above-mentioned scarcely treated eco-friendly cellulose nanocrystal according to the present invention, it was found that the cellulose nanocrystal prepared by the above-mentioned method had a similar or high value to the degree of crystallization of the initial cellulosic material Can be.

Therefore, the preparation method for non-acid-treated eco-friendly cellulose nanocrystal of the present invention can successfully induce the selective extraction of the crystalline region of cellulose.

The present invention also provides an extraction method of cellulose nanocrystals from cellulosic materials comprising the following steps:

irradiating cellulosic materials with radiation (step 1); and
homogenizing the irradiated cellulosic materials in step 1 (step 2).

A detailed description of the extraction method of cellulose nanocrystals from cellulosic materials is the same as that of the preparation method for non-acid-treated eco-friendly cellulose nanocrystals.

The crystallinity of the cellulose nanocrystal prepared by the extraction method of cellulose nanocrystals from cellulosic materials above was evaluated. As a result, the cellulose nanocrystal extracted by the method above displayed the similar crystallinity to the initial cellulosic materials (see Experimental Example, FIG. 2 and Table 2).

Therefore, the extraction method of cellulose nanocrystals from cellulosic materials of the present invention can successfully induce the selective extraction of the crystalline region of cellulose and thus the extraction method can be effectively used for the extraction of cellulose nanocrystals from cellulosic materials.

Further, the present invention provides cellulose nanocrystals prepared by the preparation method for non-acid-treated eco-friendly cellulose nanocrystals above.

The cellulose nanocrystal above is a whisker or needle type material belonging to nanocellulose, which is cellulose particle having the aspect ratio of at least 4 and the average length of 10-900 nm, preferably 50-800 nm and more preferably 100-500 nm. The preferable average thickness is 4-100 nm, and preferably 4-50 nm. The cellulose nanocrystal is obtained by selective separation of the amorphous region existing between the crystals in cellulosic materials by chemical treatment. The crystallinity is 60-90% according to the measurement method. The cellulose nanocrystal has a tensile strength of about 7.5 GPa and an elastic modulus of about 145 GPa which are much higher than those of fiberglass (4.8 GPa/86 GPa) or Kevlar fiber (3.8 GPa/130 GPa).

Hereinafter, the cellulose nanocrystal prepared by the preparation method for non-acid-treated eco-friendly cellulose nanocrystals of the present invention is described in more detail.

The length of the cellulose nanocrystal prepared by the preparation method of the present invention is 200-1,000 nm and more preferably 200-750 nm.

The aspect ratio of the cellulose nanocrystal prepared by the preparation method of the present invention is preferably 7-25.

The cellulose nanocrystal prepared by the preparation method of the present invention has carboxylate groups (COO—) and aldehyde groups (CHO) introduced therein, so that the concentration of carboxylate group (COO—) and aldehyde group (CHO) therein can be higher than the raw cellulosic materials.

The cellulose nanocrystal prepared in the example of the present invention is characterized by eco-friendliness compared with the cellulose nanocrystal prepared by the conventional acid hydrolysis method because the method of the invention does not use such a chemical as acid in the process, by saving the total process energy and by easiness in using side products. The final cellulose nanocrystal product exhibits greatly improved thermal stability and demonstrates equivalent or better aspect ratio, yield and crystallinity. In addition, the thermal stability and the aspect ratio are controlled according to the irradiation dosage.

The preparation method for non-acid-treated eco-friendly cellulose nanocrystal of the present invention is pro-environmental because this method does not use such a chemical as acid in the process, unlike the conventional cellulose nano-crystal preparation method based on acid-hydrolysis, and also has advantages of saving the total process energy and easiness in using side products.

The cellulose nanocrystal prepared by the preparation method of the present invention demonstrates similar or higher aspect ratio and yield and a significantly excellent thermal stability than the conventional cellulose nanocrystal prepared through acid hydrolysis even though it demonstrates similar crystallinity, so that it can be effectively used for the production of membranes, electrical and electronic parts, substrates, heat insulating materials, and reinforcing materials required for durability against heat.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Comparative Example 1: Preparation of Cellulose Nanocrystals by Acid Hydrolysis

The conventional preparation method for cellulose nanocrystals by acid hydrolysis is as follows.

As a cellulose-based material, a commercial conifer bleached kraft pulp sheet (HS 440, HOWE SOUND P&P Corp., Canada) was used, which was sufficiently fibrousized with a disintegrator before the reaction. 10 g of the dried pulp sample and 100 ml ultrapure water were loaded in a 1 L round bottom flask, to which 90 ml of 95% sulfuric acid was added at a rate of 10 ml per minute. The concentration of sulfuric acid in the hydrolysis reaction was about 59.2%. The mixture of the pulp and the aqueous acid solution was reacted in a 40° C. water bath for 2 hours and immediately quenched in an ice water bath to terminate the reaction. Upon completion of the reaction, the pulp suspension was centrifuged until pH of the supernatant reached neutral. The final concentration was regulated to be about 1%, followed by mechanical treatment by using a high pressure homogenizer in order to secure nanoization and dispersibility of the crystalline cellulose.

In comparative example 1, the pressure of the high pressure homogenizer was adjusted to between 20,000 and 25,000 psi, followed by circulation for 10 times, leading to the completion of the mechanical treatment.

Example 1: Preparation of Eco-Friendly Cellulose Nanocrystals Using Electron Beam 1

Step 1: Electron Beam Irradiation

As a cellulose-based material, a commercial conifer bleached kraft pulp sheet having a moisture content of less than 10% and a thickness of about 1 mm (HS 440, HOWE SOUND P&P Corp., Canada, Hansol Paper) was used, which was cut into a proper size for the following electron beam irradiation. The entire sheet was irradiated with 500 kGy of electron beam using a 1.14 Mev electron beam accelerator and then air-dried fully before being sealed and stored.

Step 2: Hot Water Extraction 10 g of the pulp irradiated with electron beam in step 1 above was taken and loaded in a 1 L round bottom flask, to which 500 mL of distilled water was added. At this time, the concentration of the pulp was 2%. The mixture was stirred for 30 minutes using a stirrer to sufficiently dissociate the pulp sheet, and then stirred for 2 hours in a 100° C. water bath. As a result, a non-differentiated cellulose slurry having brown or dark yellow color was obtained from the low molecular weight cellulose.

Step 3: Nanoization and Dispersion Through Mechanical Treatment

The cellulose slurry obtained in step 2 was filtered or centrifuged to obtain the eluted low molecular weight cellulose material.

Filtration or centrifugation was performed 1 to 3 times with 500 mL of washing buffer. The pH of the separated crystalline cellulose material was neutral and the color was white or pale yellowish white. 500 mL of distilled water was added to the crystalline cellulose slurry after filtration and washing to adjust the cellulose slurry concentration to about 1%. Mechanical treatment was then carried out to secure nanoization and dispersibility of the crystalline cellulose.

The instrument used for the mechanical treatment was a NanoDebee high pressure homogenizer (Bee International Inc.) having a throughput of 400 mL per minute and a drive pressure of 4,000 to 45,000 psi or 280 to 3,100 bar. Nanoization was induced by making the cellulose material pass through a diamond nozzle (Processing nozzle, 130/200 micron). In this example, the pressure of the high-pressure homogenizer was adjusted between 20,000 and 25,000 psi, and the mechanical treatment was completed by circulating a total of 10 times.

The cellulose nanocrystals finally prepared were transparent and the Kiral nematic was observed, and the yield of the produced nanocrystals was 59.55%.

Example 2: Preparation of Eco-Friendly Cellulose Nanocrystals Using Electron Beam 2

Cellulose nanocrystals were obtained by the same manner as described in example 1 except that the irradiation dosage of electron beam was adjusted to 1000 kGy. The characteristic analysis with the prepared cellulose nanocrystals was performed by the same manner as described in comparative example 1 and in example 1, and the yield of the produced nanocrystals was 55.74%.

Example 3: Preparation of Eco-Friendly Cellulose Nanocrystals Using Electron Beam 3

Cellulose nanocrystals were obtained by the same manner as described in example 1 except that the irradiation dosage of electron beam was adjusted to 1500 kGy. The characteristic analysis with the prepared cellulose nanocrystals was performed by the same manner as described in comparative example 1 and in example 1, and the yield of the produced nanocrystals was 52.34%.

Example 4: Preparation of Eco-Friendly Cellulose Nanocrystals Using Electron Beam 4

Cellulose nanocrystals were obtained by the same manner as described in example 1 except that the irradiation dosage of electron beam was adjusted to 2000 kGy. The characteristic analysis with the prepared cellulose nanocrystals was performed by the same manner as described in comparative example 1 and in example 1, and the yield of the produced nanocrystals was 41.18%.

Example 5: Preparation of Eco-Friendly Cellulose Nanocrystals Using Electron Beam 5

Cellulose nanocrystals were obtained by the same manner as described in example 1 except that the irradiation dosage of electron beam was adjusted to 2500 kGy. The characteristic analysis with the prepared cellulose nanocrystals was performed by the same manner as described in comparative example 1 and in example 1, and the yield of the produced nanocrystals was 37.50%.

Example 6: Preparation of Eco-Friendly Cellulose Nanocrystals Using Electron Beam 6

Cellulose nanocrystals were obtained by the same manner as described in example 1 except that the irradiation dosage of electron beam was adjusted to 3000 kGy. The characteristic analysis with the prepared cellulose nanocrystals was performed by the same manner as described in comparative example 1 and in example 1, and the yield of the produced nanocrystals was 29.20%.

Example 7: Preparation of Eco-Friendly Cellulose Nanocrystals Using Electron Beam 7

Step 1: Electron Beam Irradiation

An experiment was performed by the same manner as described in example 1 except that the irradiation dosage of electron beam was adjusted to 2000 kGy.

Step 2: Hot Water Extraction (Using Caustic Soda or Ammonia Water)

10 g of the pulp irradiated with electron beam in step 1 above was taken and loaded in a 1 L round bottom flask, to which 500 mL of distilled water was added. At this time, the concentration of the pulp was 2%. A small amount of caustic soda or ammonia water was added thereto in order to adjust to a neutral or weakly alkaline state. The mixture was stirred for 30 minutes using a stirrer to sufficiently dissociate the pulp sheet, and then stirred for 2 hours in a 100° C. water bath. As a result, a non-differentiated cellulose slurry having brown or dark yellow color was obtained from the low molecular weight cellulose.

Step 3: Nanoization and Dispersion Through Mechanical Treatment

An experiment was performed by the same manner as described in step 3 of example 1.

Example 8: Preparation of Eco-Friendly Cellulose Nanocrystals Using Electron Beam 8

Cellulose nanocrystals were obtained by the same manner as described in example 7 except that the irradiation dosage of electron beam was adjusted to 100 kGy. The characteristic analysis with the prepared cellulose nanocrystals was performed by the same manner as described in comparative example 1 and in example 1.

Example 9: Preparation of Eco-Friendly Cellulose Nanocrystals Using Electron Beam 9

Cellulose nanocrystals were obtained by the same manner as described in example 7 except that the irradiation dosage of electron beam was adjusted to 200 kGy. The characteristic analysis with the prepared cellulose nanocrystals was performed by the same manner as described in comparative example 1 and in example 1.

Example 10: Preparation of Eco-Friendly Cellulose Nanocrystals Using Electron Beam 10

Step 1: Electron Beam Irradiation

An experiment was performed by the same manner as described in example 7 except that the irradiation dosage of electron beam was adjusted to 2000 kGy.

Step 2: Hot Water Extraction

An experiment was performed by the same manner as described in step 2 of example 1.

Step 3: Nanoization and Dispersion Through Mechanical Treatment

Ultrasonification was performed using a sonicator for 5, 10, 20, and 30 minutes respectively.

Example 11: Preparation of Eco-Friendly Cellulose Nanocrystals Using Electron Beam 11

Step 1: Electron Beam Irradiation

An experiment was performed by the same manner as described in example 1 except that the irradiation dosage of electron beam was adjusted to 10 kGy.

Step 2: Hot Water Extraction 10 g of the pulp irradiated with electron beam in step 1 above was taken and loaded in a 1 L round bottom flask, which was suspended in 500 mL of distilled water. At this time, the concentration of the pulp was 2%. By using the concentrated NaOH aqueous solution, pH was regulated to be 9-10. The mixture was stirred for 30 minutes using a stirrer to sufficiently dissociate the pulp sheet, and then stirred for 2 hours in a 100° C. water bath. As a result, a non-differentiated cellulose slurry having brown or dark yellow color was obtained from the low molecular weight cellulose.

Step 3: Nanoization and Dispersion Through Mechanical Treatment

An experiment was performed by the same manner as described in step 3 of example 1.

Example 12: Preparation of Eco-Friendly Cellulose Nanocrystals Using Electron Beam 12

Cellulose nanocrystals were obtained by the same manner as described in example 11 except that the irradiation dosage of electron beam was adjusted to 20 kGy. The characteristic analysis with the prepared cellulose nanocrystals was performed by the same manner as described in comparative example 1 and in example 1.

Example 13: Preparation of Eco-Friendly Cellulose Nanocrystals Using Electron Beam 13

Cellulose nanocrystals were obtained by the same manner as described in example 11 except that the irradiation dosage of electron beam was adjusted to 50 kGy. The characteristic analysis with the prepared cellulose nanocrystals was performed by the same manner as described in comparative example 1 and in example 1.

Example 14: Preparation of Eco-Friendly Cellulose Nanocrystals Using Electron Beam 14

Cellulose nanocrystals were obtained by the same manner as described in example 11 except that the irradiation dosage of electron beam was adjusted to 100 kGy. The characteristic analysis with the prepared cellulose nanocrystals was performed by the same manner as described in comparative example 1 and in example 1.

Example 15: Preparation of Eco-Friendly Cellulose Nanocrystals Using Electron Beam 15

Cellulose nanocrystals were obtained by the same manner as described in example 11 except that the irradiation dosage of electron beam was adjusted to 200 kGy. The characteristic analysis with the prepared cellulose nanocrystals was performed by the same manner as described in comparative example 1 and in example 1.

Example 16: Preparation of Eco-Friendly Cellulose Nanocrystals Using Electron Beam 16

Cellulose nanocrystals were obtained by the same manner as described in example 11 except that the irradiation dosage of electron beam was adjusted to 500 kGy. The characteristic analysis with the prepared cellulose nanocrystals was performed by the same manner as described in comparative example 1 and in example 1.

Example 17: Preparation of Eco-Friendly Cellulose Nanocrystals Using Electron Beam 17

Cellulose nanocrystals were obtained by the same manner as described in example 11 except that the irradiation dosage of electron beam was adjusted to 1000 kGy. The characteristic analysis with the prepared cellulose nanocrystals was performed by the same manner as described in comparative example 1 and in example 1.

Example 18: Preparation of Eco-Friendly Cellulose Nanocrystals Using Electron Beam 18

Cellulose nanocrystals were obtained by the same manner as described in example 11 except that the irradiation dosage of electron beam was adjusted to 1500 kGy. The characteristic analysis with the prepared cellulose nanocrystals was performed by the same manner as described in comparative example 1 and in example 1.

Example 19: Preparation of Eco-Friendly Cellulose Nanocrystals Using Electron Beam 19

Cellulose nanocrystals were obtained by the same manner as described in example 11 except that the irradiation dosage of electron beam was adjusted to 2000 kGy. The characteristic analysis with the prepared cellulose nanocrystals was performed by the same manner as described in comparative example 1 and in example 1.

Example 20: Preparation of Eco-Friendly Cellulose Nanocrystals Using Electron Beam 20

Cellulose nanocrystals were obtained by the same manner as described in example 11 except that the irradiation dosage of electron beam was adjusted to 2500 kGy. The characteristic analysis with the prepared cellulose nanocrystals was performed by the same manner as described in comparative example 1 and in example 1.

Example 21: Preparation of Eco-Friendly Cellulose Nanocrystals Using Electron Beam 21

Cellulose nanocrystals were obtained by the same manner as described in example 11 except that the irradiation dosage of electron beam was adjusted to 3000 kGy. The characteristic analysis with the prepared cellulose nanocrystals was performed by the same manner as described in comparative example 1 and in example 1.

Experimental Example 1: Evaluation of Thermal Stability of Cellulose Nanocrystals To evaluate the thermal stability of the cellulose nanocrystals obtained in comparative example 1, example 2 and example 4 according to the present invention, thermogravimetric analysis was performed. The results are shown in FIG. 1 and Table 1 below.

Particularly, the thermogravimetric analysis is an analytical method capable of examining the thermal decomposition behavior of a sample by gradually raising the temperature from room temperature to 500~600° C. under nitrogen or oxygen atmosphere. By investigating the changes in mass of the sample over the temperature, the content of Char and the point where the pyrolysis starts or the most vigorous point can be measured.

FIG. 1 is a graph illustrating the results of thermogravimetric analysis with the cellulose nanocrystals prepared in comparative example 1 and examples 2 and 4 according to the present invention.

As shown in FIG. 1, the cellulose nanocrystals irradiated with electron beam prepared in example 2 and example 4 showed remarkably improved thermal stability than the cellulose nanocrystals prepared by acid hydrolysis in comparative example 1.

TABLE 1

|  | Irradiation dosage of electron beam (kGy) | $T_{10\%}$ (□) | $T_{max}$ (□) | Char at 600 □ (%) |
|---|---|---|---|---|
| Pulp | — | 320.0 | 362.3 | 10.74 |
| Comparative Example 1 | — | 155.7 | 155.4 | 19.51 |
| Comparative Example 2 | 1000 | 247.5 | 306.6 | 1.13 |
| Comparative Example 4 | 2000 | 229.2 | 297.0 | 8.37 |

In Table 1, $T_{10}\%$ is the temperature where the mass loss rate of the sample caused by heating reached 10% by the total mass (considered as the point at which pyrolysis starts); $T_{max}$ indicates the temperature where pyrolysis is most active; and Char at 600° C. indicates the content of carbide remaining after burning at the temperature up to 600° C.

As shown in Table 1, pyrolysis of the cellulose nanocrystals irradiated with electron beam prepared in example 2 and example 4 started at least 70° C. higher temperature than the cellulose nanocrystal prepared by acid hydrolysis in comparative example 1. Pyrolysis of the cellulose nanocrystal prepared in example 2 irradiated with the higher dosage of electron beam started at a temperature about 20° C. higher than the cellulose nanocrystal prepared in example 4.

The cellulose nanocrystals irradiated with electron beam of examples 2 and 4 of the present invention demonstrated more vigorous pyrolysis activity at a temperature higher than 140° C., compared with the cellulose nanocrystal prepared by acid hydrolysis in comparative example 1. The cellulose nanocrystals prepared in examples 2 and 4 were compared, and as a result, the cellulose nanocrystal prepared in example 2 with less dosage of electron beam demonstrated the most vigorous pyrolysis at a temperature about 10° C. higher than the cellulose nanocrystal prepared in example 4.

More precisely, the pyrolysis starting temperature of the cellulose nanocrystal prepared by acid hydrolysis in comparative example 1 was almost the same as the maximum pyrolysis action temperature, indicating that a huge structural change can be accompanied from the start of the pyrolysis.

In the meantime, the pyrolysis starting temperature of the cellulose nanocrystals irradiated with electron beam prepared in examples 2 and 4 was about 60~70° C. different from the temperature where the maximum pyrolysis was shown.

The results above indicate that the cellulose nanocrystal prepared by the preparation method for non-acid-treated eco-friendly cellulose nanocrystal of the present invention itself or the product prepared by adding the same has the effect of delaying the structural destruction when it is exposed to heat, indicating it has a significantly improved thermal stability, compared with the conventional cellulose nanocrystal.

Experimental Example 2: Evaluation of Crystallinity of Cellulose Nanocrystal

Figure 2:
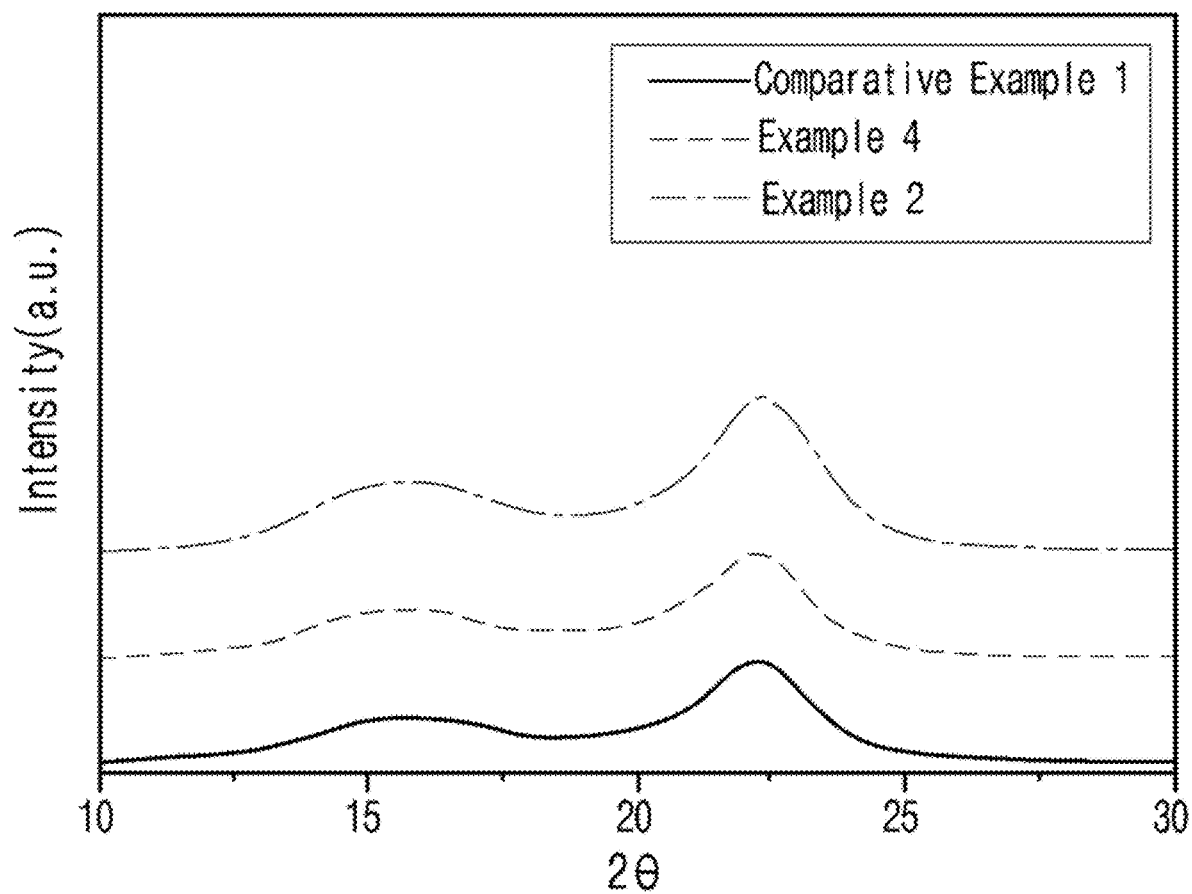
FIG. 2 is a graph illustrating the results of X-ray diffraction with the cellulose nanocrystals prepared in comparative example 1 and examples 2 and 4 according to the present invention.

To evaluate the crystallinity of the cellulose nanocrystal of the present invention, X-ray diffraction was performed and the results are shown in FIG. 2 and Table 2 below.

Particularly, X-ray diffraction is an analytical method for measuring the crystallinity of the prepared cellulose nanocrystals. The crystallinity can be easily calculated by comparing the intensity of the diffraction ($I_{002}$) corresponding to 002 face (crystalline region, diffraction peak 22.5°) in the cellulose unit cell with the intensity of the diffraction ($I_{AM}$) measured in the amorphous region (between 101 and 002 diffraction peaks, that is between 18° and 22.8°) (Segal formula). The crystallinity measured by the method above is not an absolute value and can be estimated by Infrared spectroscopic analysis (FTIR) or nuclear magnetic resonance (NMR).

FIG. 2 is a graph illustrating the results of X-ray diffraction with the cellulose nanocrystals prepared in comparative example 1 and examples 2 and 4 according to the present invention.

Cellulose has both crystalline region and amorphous region, and thus X-ray diffractogram of each crystal face of (101) and (002) displays a strong diffraction (FIG. 2). Among the 3-dimensional crystal lattice of cellulose, the region where the chain molecules of the cellulose are regularly arranged is called the crystalline region (crystallite), and the region where the cellulose molecules are irregularly arranged is called the non-crystalline region (amorphous region).

The crystallinity (Crl %) of cellulose can be easily calculated by comparing the intensity of the diffraction ($I_{002}$) corresponding to (002) face (crystalline region, diffraction peak 22.5°) in the cellulose unit cell with the intensity of the diffraction ($I_{AM}$) measured in the amorphous region (between 101 and 002 diffraction peaks, that is between 18° and) 22.8°. The crystallinity (Crl %) herein was calculated by Segal method and Curve-fitting (Area) method. The equation is shown in Mathematical Formula 1.

$$Crl(\%) = \frac{I_{002} - I_{AM}}{I_{002}} \times 100 \qquad \text{[Mathematical Formula 1]}$$

$I_{(002)}$: 2Θ=Intensity corresponding to 22.8°, and $I_{am}$: 2Θ=Intensity corresponding to 18°. The crystallinity measured by the method above is not an absolute value and can be estimated by Infrared spectroscopic analysis (FTIR) or nuclear magnetic resonance (NMR).

TABLE 2

| | CrI (%) Segal. |
|---|---|
| Pulp | 76 |
| Comparative Example 1 | 71 |
| Example 2 | 70 |
| Example 4 | 70 |

As shown in table 2, the crystallinity of the cellulose nanocrystal prepared by the conventional acid hydrolysis based method, which was measured by X-ray diffraction in comparative example 1, was approximately 70% and the crystallinity of the electron beam irradiated cellulose nanocrystals prepared in example 2 and example 4 was approximately 70% as well.

When nanoization is accomplished as the amorphous region of cellulose is not eliminated randomly, the crystallinity is rapidly decreased. However, the amorphous region is primarily eliminated through acid-treatment or electron beam irradiation before the nanoization is completed, the crystallinity is similar or even higher than that of the initial cellulosic materials, indicating that the selective extraction of the crystalline region of cellulose can be achieved by the preparation method for non-acid-treated eco-friendly cellulose nanocrystal of the present invention.

Experimental Example 3: Confirmation of Cellulose Nanocrystal Production According to the Instrument Used in the Homogenization Step To investigate the effect of an instrument used in the course of homogenization of cellulose nanocrystal on the preparation of nanocrystal according to the present invention, the cellulose nanocrystals prepared in example 10 and example 4 were photographed and the images are shown in FIG. 3.

In example 1, the driving pressure of the high pressure homogenizer was adjusted to 25,000 psi and the mechanical treatment was terminated after 10 times of circulation. In the case of example 10 for comparison, the ultrasonic treatment was adjusted so as to be equal to the use time of the high pressure homogenizer.

More particularly, the NanoDebee high pressure homogenizer (Bee International Inc.) used in example 1 has the treatment capability of 400 ml per minute. So, in order to prepare 1 L of cellulose nanocrystal using the high pressure homogenizer of the present invention, 25 minutes (1000 ml/400 ml×10 times) is consumed. Considering the calculation above, the ultrasonic treatment in example 10 was performed for a maximum of 30 minutes.

Figure 3:
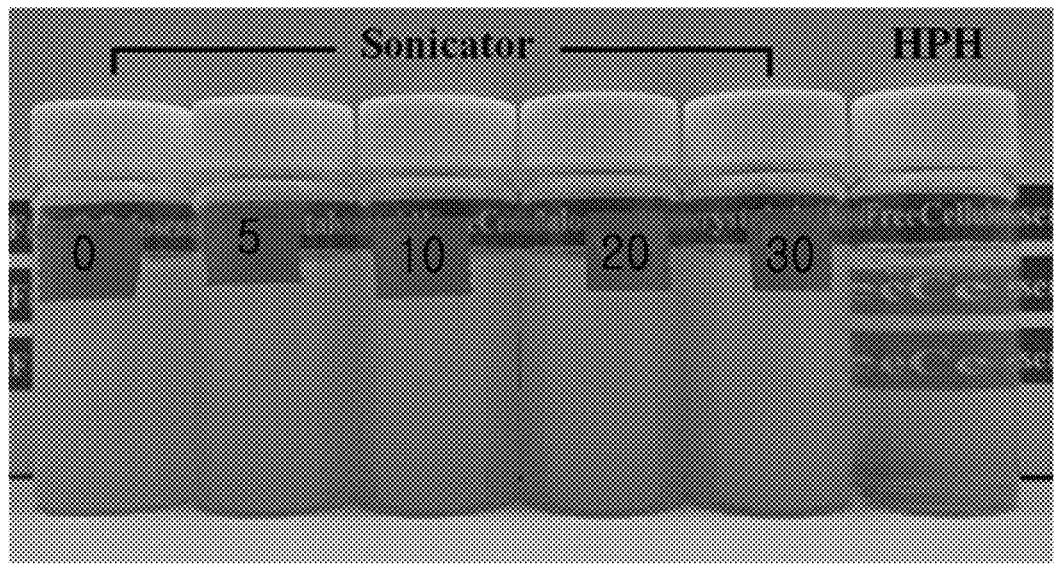
FIG. 3 is a set of photoimages of the cellulose nanocrystals prepared in examples 10 and 4 (sonicator: ultrasonic device, HPH: high-pressure homogenizer, 0: no homogenization treatment, 5: sonication for 5 minutes, 10: sonication for 10 minutes, 20: sonication for 20 minutes, 30: sonication for 30 minutes).

FIG. 3 is a set of photoimages of the cellulose nanocrystals prepared in examples 10 and 4.

As shown in FIG. 3, it was confirmed that the nanoization of the cellulose nanocrystal of example 10 was hardly achieved even when the treatment time of ultrasonication was increased.

Therefore, it was confirmed that the cellulose nanocrystal of the present invention cannot be prepared by using the ultrasonic apparatus instead of the high pressure homogenizer in the homogenization step.

Experimental Example 4: Evaluation of Yield of Cellulose Nanocrystal According to the Dosage of Electron Beam To compare the yield of cellulose nanocrystal according to the dosage of electron beam in this invention, the cellulose nanocrystal yields in examples 1~6 were evaluated and the results are shown in Table 3 below.

TABLE 3

| Example | Electron beam dosage (kGy) | Input amount (g) | After extraction (g) | Yield of hot water extraction (%) | After HPH-centrifugation (g) | Yield of nanocrystal (%) |
|---|---|---|---|---|---|---|
| 1 | 500 | 9.98 | 8.90 | 89.17 | 5.94 | 59.55 |
| 2 | 1000 | 10.01 | 6.66 | 66.53 | 5.58 | 55.74 |
| 3 | 1500 | 9.98 | 5.70 | 57.11 | 5.22 | 52.34 |
| 4 | 2000 | 10.01 | 5.19 | 51.85 | 4.12 | 41.18 |
| 5 | 2500 | 10.00 | 4.36 | 43.58 | 3.75 | 37.50 |
| 6 | 3000 | 10.00 | 3.54 | 35.42 | 2.92 | 29.20 |

As shown in Table 3 above, as the dosage of electron beam increased, the yield of nanocrystal was reduced. In particular, when the dosage of electron beam was 3000 kGy in example 6, the yield was as low as up to 29%.

Experimental Example 5: Evaluation of Yield of Cellulose Nanocrystal According to the Condition of Hot Water Extraction To compare the cellulose nanocrystal yields according to the condition of hot water extraction, such conditions as the dosage of electron beam, extraction temperature and time, and washing and mechanical treatment were adjusted equally except for the solution condition of hot water extraction. The yields of cellulose nanocrystals prepared in examples 4 and 7 according to the different hot water extraction conditions were evaluated and the results are shown in Table 4 below.

TABLE 4

| Example | Input amount (g) | After extraction (g) | Yield of hot water extraction (%) | After HPH-centrifugation (g) | Yield of nanocrystal (%) |
|---|---|---|---|---|---|
| 4 | 10.00 | 5.19 | 51.85 | 4.12 | 41.18 |
| 7 | 10.00 | 5.42 | 54.20 | 5.14 | 51.40 |

As shown in Table 4, the yield of nanocrystal in example 4 wherein only pure water was used for the extraction was 41.18%, and the yield of nanocrystal in example 7 wherein an alkali solution prepared by using caustic soda or ammonia water was used for the extraction was 51.40%.

lulose according to aspect ratio, surface charge, degree of polymerization and degree of crystallization (Roadmap for the Development of International Standards for Nanocellulose, TAPPI, 2011). In general, the aspect ratio of nanofiber is 30~200 and the aspect ratio of nanocrystal is 5~25.

TABLE 5

| Example | Dosage of electron beam (kGy) | Degree of polymerization (DP) | Aspect ratio | Size, length/width (nm/nm) | Transmittance (%) | Surface charge (mV) |
| --- | --- | --- | --- | --- | --- | --- |
| Pulp | — | 998 | — | — | — | — |
| 1 | 500 | 98 | 23.64 | 662/28 | — | — |
| 2 | 1000 | 78 | 19.35 | 600/31 | — | — |
| 3 | 1500 | 70 | 15.73 | 409/26 | — | — |
| 4 | 2000 | 65 | 10.44 | 282/27 | — | — |
| 5 | 2500 | 61 | 7.35 | 228/31 | — | — |
| 6 | 3000 | 59 | 4.2 | 126/30 | — | — |
| 8 | 100 | 155.9 | — | — | — | — |
| 9 | 200 | 125.6 | — | — | — | — |
| 16 | 500 | 98 | 24.9 | 747/28 | 80.8 | −30.5 ± 1.5 |
| 17 | 1000 | 78 | 19.27 | 578/30 | 84.3 | −36.5 ± 0.7 |
| 18 | 1500 | 70 | 14.26 | 385/27 | 85.1 | −37.5 ± 0.4 |
| 19 | 2000 | 65 | 10.96 | 285/26 | 89.6 | −39.2 ± 0.5 |
| 20 | 2500 | 61 | 7.22 | 224/31 | 92.0 | −41.2 ± 0.8 |
| 21 | 3000 | 59 | 5.56 | 128/23 | 95.1 | −47.5 ± 3.0 |

In the present invention, when pure water was used in the step of hot water extraction, the cellulose nanocrystal was obtained with a relatively low yield, compared with when an alkali solution was used.

Therefore, in the preparation method for non-acid-treated eco-friendly cellulose nanocrystal of the present invention, the yield of the target nanocrystal can be increased by using an alkali solution in the course of hot water extraction.

Figure 4:
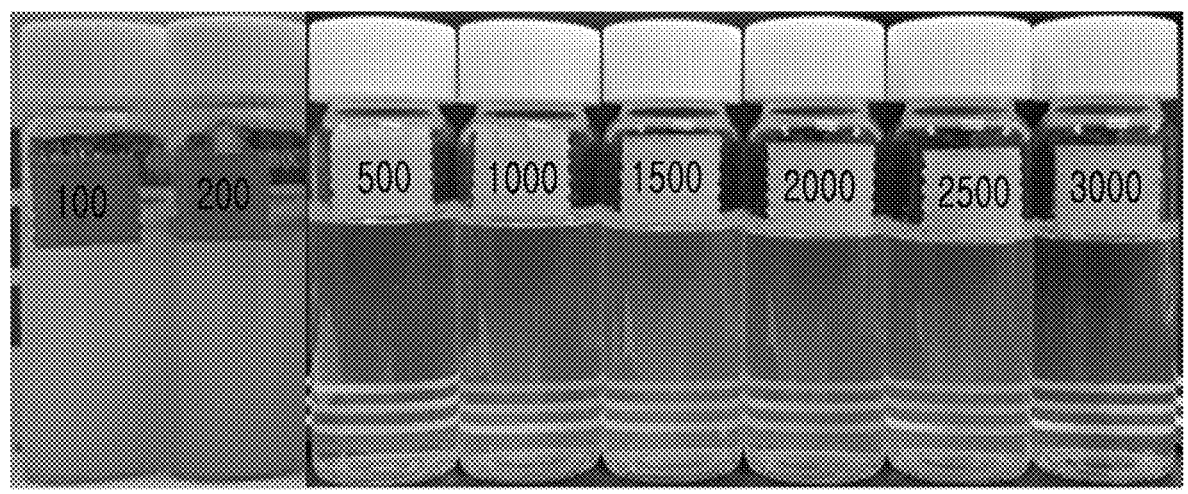
FIG. 4 is a set of photoimages of the cellulose nanocrystals prepared in examples 8, 9 and 16~21 according to the present invention (100: 100 kGy, 200: 200 kGy, 500: 500 kGy, 1000: 1000 kGy, 2000: 2000 kGy, 2500: 2500 kGy, 3000: 3000 kGy).
Figure 5:
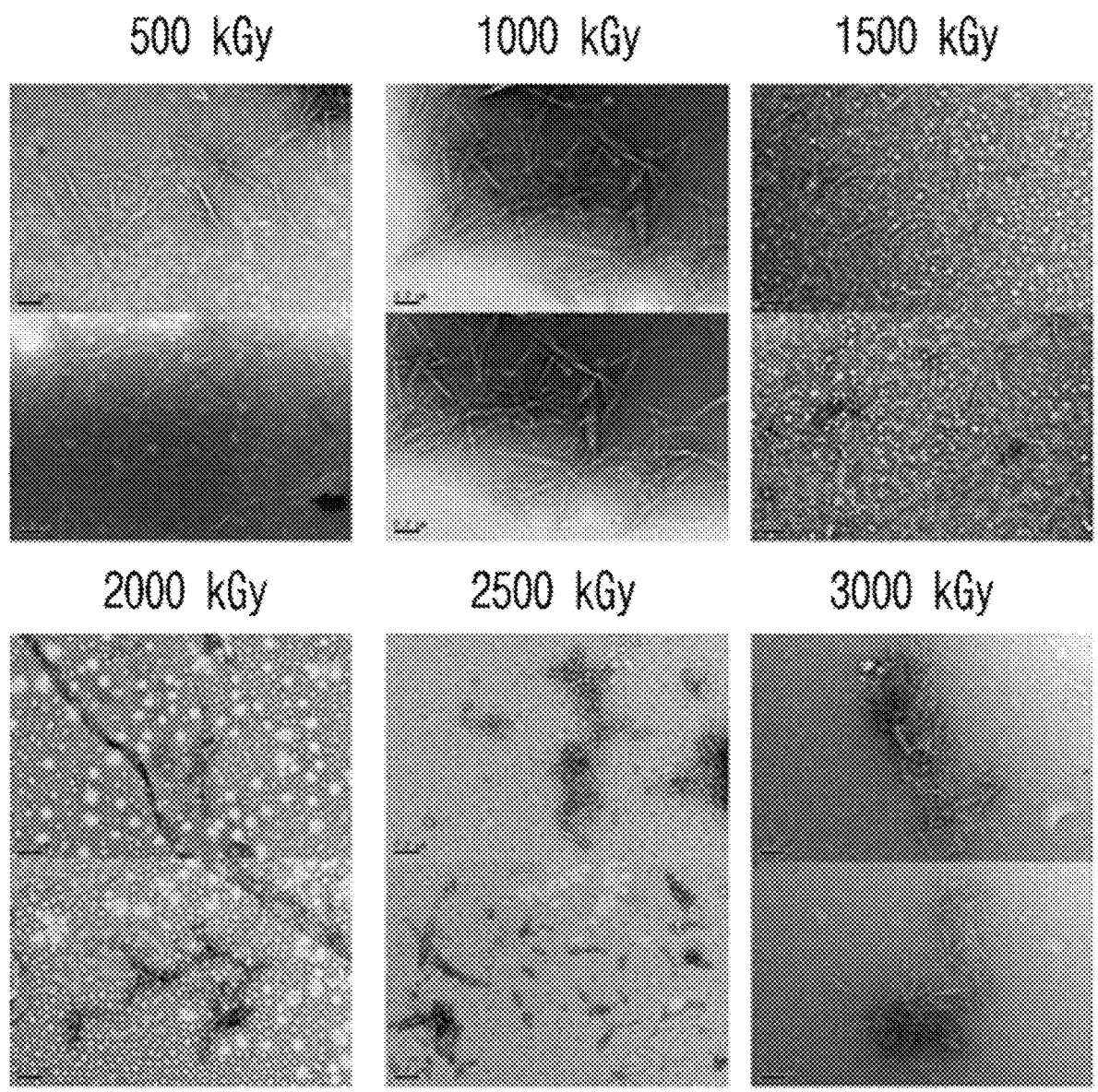
FIG. 5 is a set of transmission electron microscope (TEM) images of the cellulose nanocrystals prepared in examples 16~21 according to the present invention.
Figure 6:
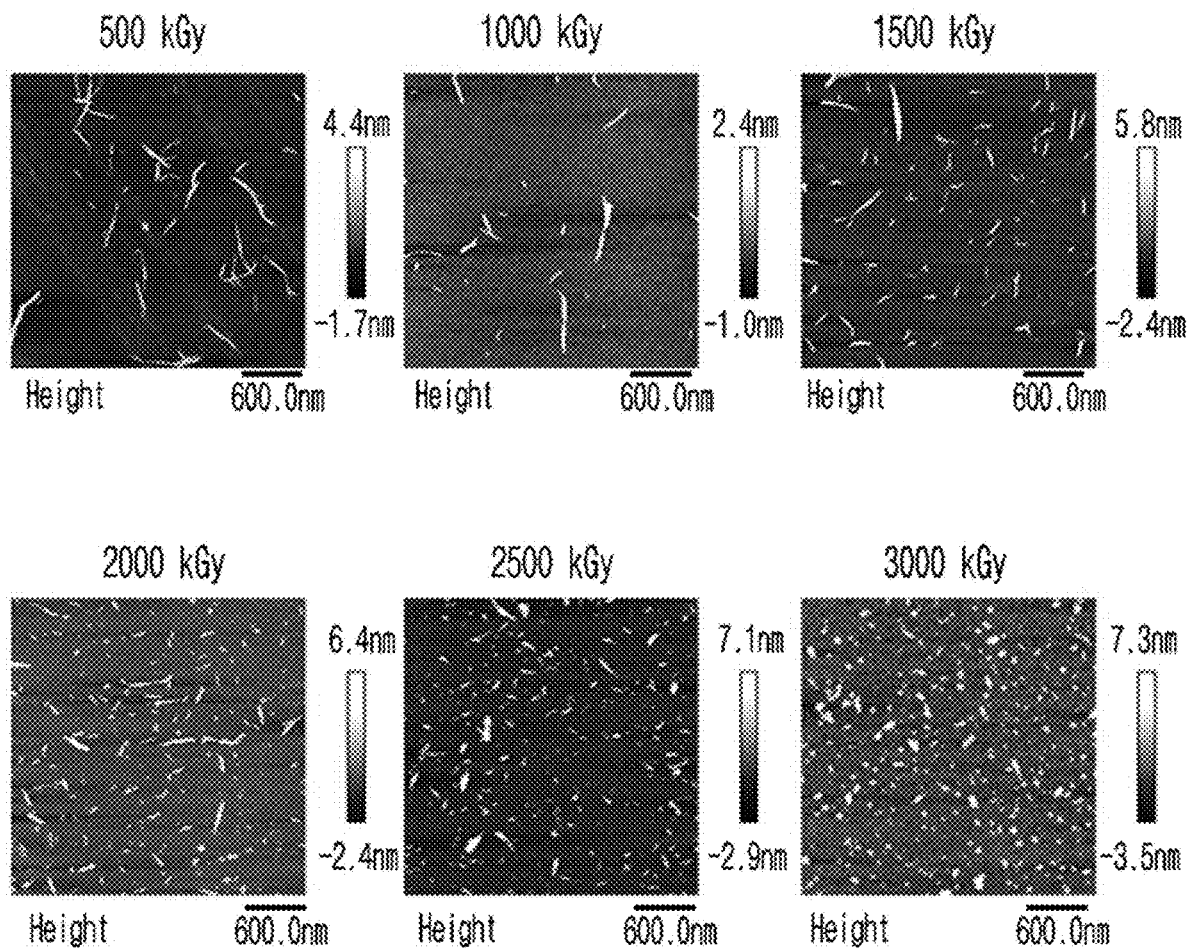
FIG. 6 is a set of atomic force microscope (AFM) images of the cellulose nanocrystals prepared in examples 16~21 according to the present invention.

Experimental Example 6: Evaluation of Characteristics of Cellulose Nanocrystal According to the Dosage of Electron Beam To compare the characteristics of cellulose nanocrystal according to the dosage of electron beam, the degree of polymerization, size (length/width), transmittance and surface charge were measured and the results are shown in Table 5 below. The cellulose nanocrysrals prepared in examples 8, 9 and 16~21 were photographed and the images are shown in FIG. 4. The shapes of the cellulose nanocrystals prepared in examples 16~21 were analyzed by transmission electron microscope (TEM) and the results are shown in FIG. 5. The shapes of the cellulose nanocrystals prepared in examples 16~21 were analyzed by atomic force microscopy (AFM) and the results are shown in FIG. 6.

Particularly, the surface charge was measured using NanoBrook ZetaPALS (Brookhaven Instruments) at a concentration of 0.3 w/v % under the conditions of a temperature of 35° C., a dielectric constant of 78.54, and a viscosity of 0.89 cP. In Table 5 below, averages of the five measurements are listed.

Currently, nanocellulose is defined as a cellulose-based material having a length or width of 100 nm or less based on ISO-TC 229. The criteria to distinguish cellulose nanofibers (CNFs) from cellulose nanocrystals (CNCs) are not clearly defined up to date, yet considering the discussion for the standardization, it is necessary to define terms of nanocel- As shown in Table 5, as the dosage of electron beam increased, the degree of polymerization, aspect ratio and the length of nanocrystal decreased.

The degree of polymerization of the nanocrystal of example 6 irradiated with 3000 kGy of electron beam was significantly reduced, compared with those of the nanocrystals of examples 1-5, but the transmittance thereof was the highest. Considering the aspect ratio and the size when 3000 kGy of electron beam was irradiated, it was suggested that not only the amorphous region but also the whole cellulose were destroyed.

In the meantime, the degree of polymerization of the cellulose nanocrystals prepared in examples 1~5 was up to 100, the aspect ratio thereof was 7-25 and the length thereof was at least 200 nm, indicating that the amorphous region was destroyed by the electron beam irradiation but the shape of the cellulose nanocrystal was maintained.

The nanocrystals of examples 16~20 treated with an alkali solution in the course of hot water extraction displayed the degree of polymerization up to 100, the aspect ratio of 7-25 and the length of 200-1000 nm, indicating that the amorphous region was destroyed by the electron beam irradiation but the shape of the nanocrystal was maintained. This result proves that the cellulose nanocrystal can be prepared either in the alkali condition during the hot water extraction or not. That is, the cellulose nanocrystal of the present invention has the degree of polymerization of 100 or less and the aspect ratio of 5 to 25, which satisfies the general definition of nanocrystal.

In conclusion, considering the aspect ratio of the cellulose nanocrystal of the present invention is 7-25 and the width of the nanocrystal prepared regardless of the dosage of electron beam is about 30 nm, the preferable length of nanocrystal to satisfy the general aspect ratio to define cellulose nanocrystal is 200-750 nm. Considering the shape and yield of the celllose nanocrystal pursued by the present invention, the preferable dosage of electron beam is 500-2500 kGy and the more preferable dosage is 1500-2500 kGy.

FIG. 4 is a set of photoimages of the cellulose nanocrystals prepared in examples 8, 9 and 16~21 according to the present invention.

FIG. 5 is a set of transmission electron microscope (TEM) images of the cellulose nanocrystals prepared in examples 16~21 according to the present invention.

FIG. 6 is a set of atomic force microscope (AFM) images of the cellulose nanocrystals prepared in examples 16~21 according to the present invention.

As shown in FIG. 4, the degree of polymerization of pulp sheet of the cellulose nanocrystals prepared in examples 16-21 was up to 100, which indicated that the target cellulose nanocrystal products of the present invention could be prepared with transparency. In the meantime, the degree of polymerization of those prepared in examples 8 and 9 with the irradiation of electron beam at the dosages of 100 and 200 kGy respectively was at least 100, indicating that the amorphous region of the cellulose was not destroyed and thus they remained as unclear and opaque solution phase.

As shown in FIG. 5 and FIG. 6, as the dosage of electron beam increased, the aspect ratio of the produced nanocrystal was reduced.

Experimental Example 7: Evaluation of Characteristics of Pulp According to Electron Beam Irradiation and Hot Water Treatment Under Alkali Condition In examples 11~21, the characteristics of pulp after the execution of step 1 and step 2 (electron beam irradiation and hot water treatment under alkaline condition) were evaluated.

Particularly, in examples 11~21, the cellulose pulp finished with the steps of 1 and 2 and the pulp treated with acid in comparative example 1 proceeded to the investigation of the intrinsic viscosity of pulp ([η]), average viscosity, degree of polymerization, weight average molecular weight of cellulose pulp, weight average molecular weight and polydispersity of cellulosic tricarbanilates (CTCs), average content of carboxylate (COO—) and aldehyde (CHO) groups of cellulose pulp, crystallization index of cellulose pulp, initial thermaldecomposition temperatures and temperature of maximum degradation rate before the step of homogenization, and the results are shown in Table 6 below.

TABLE 6

| Example | Dosage of electron beam (kGy) | [η] (ml g$^{-1}$) | $DP_V$ | $M_{w\ by\ CED}$ (kg mol$^{-1}$) | $M_{w\ by\ CTC}$ (kg mol$^{-1}$) (Đ) | COO$^-$ (CHO) content (mmol g$^{-1}$) | CrI (%) | $T_{d\ onset}$ (□) | $T_{d\ max}$ (□) |
|---|---|---|---|---|---|---|---|---|---|
| Pulp | — | 690 | 998 | 161.7 | 568.0 (3.1) | 0.03 (0.003) | 85 | 308 | 362 |
| 11 | 10 | 367 | 497 | 80.5 | 142.3 (3.2) | 0.02 (0.003) | 84 | 292 | 343 |
| 12 | 20 | 268 | 350 | 56.7 | 113.6 (3.2) | 0.02 (0.004) | 85 | 292 | 348 |
| 13 | 50 | 180 | 226 | 36.6 | 50.0 (2.9) | 0.04 (0.005) | 85 | 292 | 341 |
| 14 | 100 | 129 | 156 | 25.3 | 44.2 (3.6) | 0.03 (0.007) | 83 | 288 | 338 |
| 15 | 200 | 106 | 126 | 20.4 | 35.4 (3.1) | 0.04 (0.010) | 82 | 277 | 344 |
| 16 | 500 | 85 | 98 | 15.9 | 26.2 (1.5) | 0.11 (0.018) | 83 | 279 | 329 |
| 17 | 1000 | 69 | 78 | 12.6 | 13.1 (2.5) | 0.13 (0.025) | 82 | 271 | 326 |
| 18 | 1500 | 62 | 70 | 11.3 | 8.7 (1.9) | 0.19 (0.028) | 81 | 253 | 313 |
| 19 | 2000 | 59 | 65 | 10.5 | 8.6 (1.9) | 0.30 (0.035) | 79 | 251 | 319 |
| 20 | 2500 | 55 | 61 | 9.9 | 8.3 (1.7) | 0.52 (0.045) | 75 | 231 | 304 |
| 21 | 3000 | 54 | 59 | 9.6 | 7.8 (1.7) | 0.84 (0.049) | 68 | 220 | 300 |
| Comparative Example 1 | — | 186 | 234 | 37.9 | 49.4 (3.2) | 0.20 (SO$_3^-$) | 84 | 165 | 217 |

As shown in those images in FIG. 5 and FIG. 6, the nanomaterials smaller in size and shape than the image of the nanocrystal to be expected could be identified in the cellulose nanocrystal of example 21 irradiated with electron beam at the dosage of 3000 kGy. This result indicates that not only the amorphous region of the cellulose but also the whole cellulose was destroyed.

That is, in order to prepare the cellulose nanocrystal to satisfy the purpose of the present invention, electron beam has to irradiate at the dosage of 500-2500 kGy.

Therefore, the preferable dosage of irradiation in the preparation method for non-acid-treated eco-friendly cellulose nanocrystal of the present invention is confirmed to be 500-2500 kGy.

As shown in Table 6, the intrinsic viscosity ([η]) of the cellulose pulp was obtained from [η].c of annex B of "ASTM D1795-96. In *Annual book of ASTM standard.* American Society for Test and Materials, International: West Conshohocken, Pa., 1996." corresponding to the different values of the viscosity ratio (ηratio(η/η0)), wherein c indicates the mass concentration of the cellulose pulp in the aqueous cupriethylenediamine (CED) solution (0.5 M in H$_2$O). Annex B value was calculated by using Martin equation. The viscosity ratio (ηratio) was calculated by the following formula: $\eta_{ratio}=\eta/\eta 0=h \times t$, wherein h indicates the viscometer constant (s$^{-1}$) obtained in the process of correction, which indicates efflux time (s) of the test solution.

The average viscometric degree of polymerization (DPv) of the cellulose pulp was calculated from the intrinsic viscosity by using the following formula: $DP_v^{0.905}=0.75 \cdot [\eta]$.

The weight average molecular weight ($M_{w\ by\ CEO}$) of the cellulose pulp was calculated by the following formula: DP=Mw/162 (molecular weight of glucose in cellulose-units=162 g mol$^{-1}$).

The weight average molecular weight ($M_{w\ by\ CTC}$) and the polydispersity (Đ) of the cellulosic tricarbanilates (CTCs) were determined by size exclusion chromatography (SEC) in tetrahydrofuran at 40° C.

The average content (mmol g-$^1$) of carboxylate group (COO—) and aldehyde group (CHO) in the cellulose pulp was evaluated by using conductometric titration. Particularly, the quantitative amount (μmol g$^{-1}$) of the carbonyl group in the sample was determined, and the degree of oxidation was evaluated by oxidation reaction of both aldehyde and ketone with hydroxylamine hydrochloride. At this time, the value in parentheses is the average content of aldehyde group.

The crystallinity index (CrI) of the cellulose pulp was determined by XRD height method and the following formula reported by Segal, et al. CrI (%)=[($I_{002}$–$I_{am}$)/$I_{002}$]×100, wherein, $I_{002}$ is the peak intensity of the main crystalline plane (002) lattice diffraction at 2θ=22-23°, while $I_{am}$ is the diffraction intensity of the amorphous fraction at 2θ=18-19°.

$T_{d\ onset}$ (° C.) is the initial thermaldecomposition temperature, which is the temperature determined by thermal gravimetric analysis (thermal gravimetric analysis (TGA) at the heating rate of 20° C. min-$^1$ where 5% mass loss is observed.

$T_{d\ max}$ (° C.) is the temperature of maximum degradation rate (% min$^{-1}$), which is determined by using differential thermogravimetric curve (DTG).

As shown in Table 6, the intrinsic viscosity of the dissociated cellulose pulp was reduced as the dosage of electron beam increased. Particularly, when the pulp was irradiated at the dosage of 10-200 kGy, the intrinsic viscosity was 100 or more. In the meantime, when the pulp was irradiated at the dosage of 500-3000 kGy, the intrinsic viscosity of the dissociated cellulose pulp was sharply reduced to up to 90. In the case of the acid-hydrolyzed pulp of comparative example 1, the intrinsic viscosity was similar to that of when the pulp was irradiated at the dosage of 50 kGy.

The average viscosity polymerization degree of the dissociated cellulose pulp was reduced as the dosage of electron beam increased. When the pulp was irradiated at the dosage of 10-200 kGy, the degree of polymerization was at least 120. In the meantime, when the pulp was irradiated at the dosage of 500-3000 kGy, the degree of polymerization of the dissociated cellulose pulp was reduced to up to 100. In the case of the acid-hydrolyzed pulp of comparative example 1, the degree of polymerization was similar to that of when the pulp was irradiated at the dosage of 50 kGy.

The weight average molecular weight of the dissociated cellulose pulp was reduced as the dosage of electron beam increased. When the pulp was irradiated at the dosage of 10-200 kGy, the weight average molecular weight was at least 20. When the pulp was irradiated at the dosage of 500-3000 kGy, the weight average molecular weight of the dissociated cellulose pulp was reduced to up to 16. In the case of the acid-hydrolyzed pulp of comparative example 1, the weight average molecular weight was similar to that of when the pulp was irradiated at the dosage of 50 kGy.

The weight average molecular weight ($M_{w\ by\ CTC}$) and the polydispersity (Đ) of the cellulosic tricarbanilates (CTCs) were reduced gradually as the dosage of electron beam increased. When the cellulosic tricarbanilates were irradiated at the dosage of 10-200 kGy, $M_{w\ by\ CTC}$ was at least 35. When the cellulosic tricarbanilates were irradiated at the dosage of 500-3000 kGy, $M_{w\ by\ CTC}$ was reduced to up to 27. In particular, when the dosage was increased more than 1500 kGy, $M_{w\ by\ CTC}$ was less than 10. In the case of polydispersity, when the cellulosic tricarbanilates were irradiated at the dosage of 10-200 kGy, the polydispersity was similar to that of pure pulp. However, when the cellulosic tricarbanilates were irradiated at the dosage of more than 500 kGy, the polydispersity was rapidly reduced to less than 2.5.

The dissociated cellulose pulp prepared with the irradiation of electron beam at the dosage of 10-200 kGy contained carboxylate group (COO—) at the concentration of 0.02-0.05 mmol g$^{-1}$, which was similar to that of the non-treated pulp itself. However, when the pulp was irradiated with a relatively high irradiation dosage of 500-3000 kGy, the content of carboxylate group in the pulp was significantly increased to 0.11-0.84 mmol g$^{-1}$. In the case of the acid-hydrolyzed pulp of comparative example 1, the content of carboxylate group (0.20 mmol g$^{-1}$) was similar to or higher than the content of sulfate ($SO_3^-$).

Considering all the evaluations of the intrinsic viscosity, average viscosity polymerization degree, weight average molecular weight of cellulose pulp, weight average molecular weight ($M_{w\ by\ CTC}$) of cellulosic tricarbanilates (CTCs), polydispersity (Đ), and the content of carboxylate group (COO—) according to the dosage of electron beam, it was indicated that when the pulp was irradiated at the dosage of 10-200 kGy, the amorphous region of the cellulose was not destroyed and instead the size of the cellulose itself was reduced. When the pulp was irradiated at the dosage of more than 500 kGy, the amorphous region of the cellulose was destroyed, so that the cellulose nanocrystal could be prepared.

Figure 7:
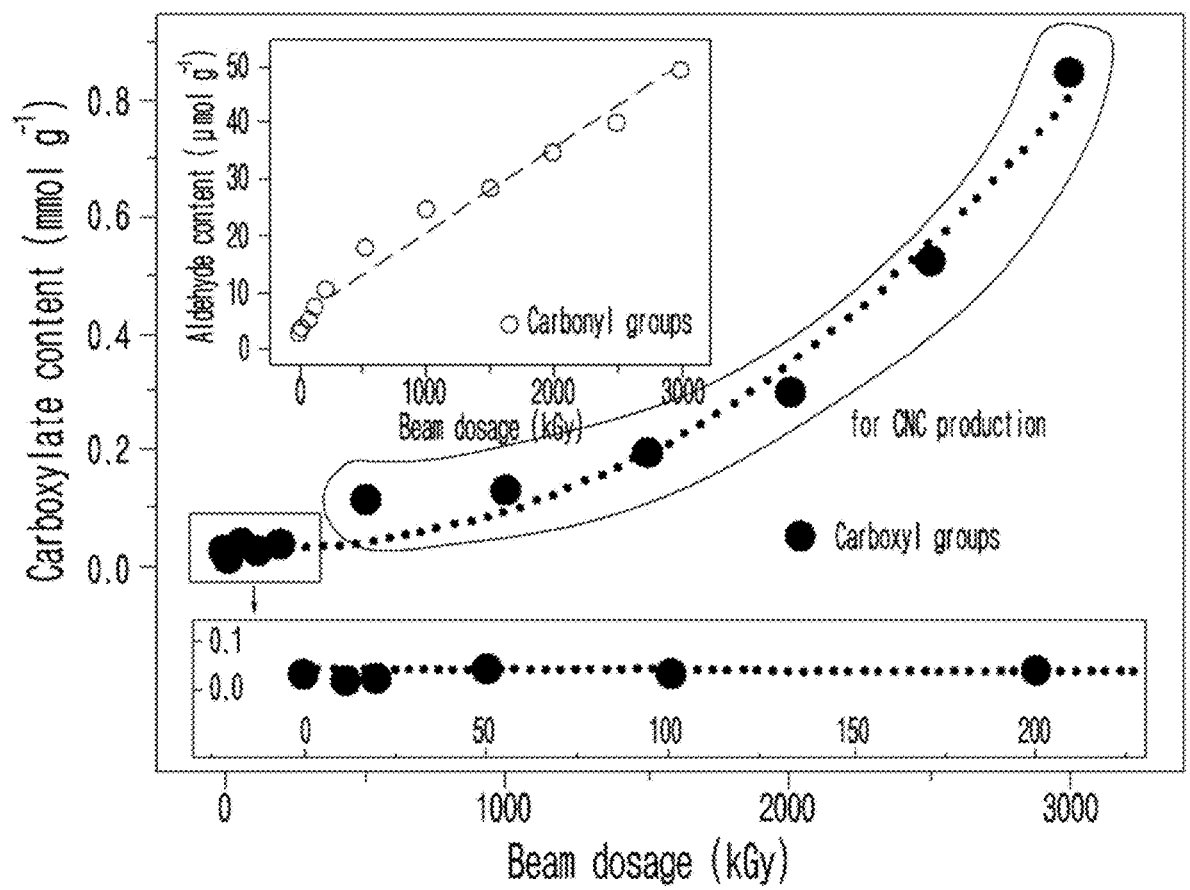
FIG. 7 is a graph illustrating the contents of carboxyl groups and aldehyde groups of the cellulose nanocrystals of the present invention according to the dosage of electron beam irradiation.

Experimental Example 8: Evaluation of Carboxyl Group Content in Cellulose Nanocrystal According to the Dosage of Electron Beam The average contents (mmol g-$^1$) of carboxylate group (COO—) and aldehyde group (CHO) in cellulose nanocrystal according to the irradiation dosage were evaluated by conductometric titration. Particularly, the quantitative amount (μmol g$^{-1}$) of the carbonyl group in the sample was determined, and the degree of oxidation was evaluated by oxidation reaction of both aldehyde and ketone with hydroxylamine hydrochloride. The results are shown in FIG. 7. At this time, as shown in FIG. 7, the carboxylate content and the aldehyde content presented in the inset are expressed as a function of irradiation dosage.

FIG. 7 is a graph illustrating the contents of carboxyl groups and aldehyde groups of the cellulose nanocrystals of the present invention according to the dosage of electron beam irradiation.

As shown in FIG. 7, when the dosage of electron beam was less than 500 kGy, the content of carboxylate was hardly detected. When the dosage of electron beam was more than 500 kGy, the content of carboxylate was increased gradually dose-dependently.

As shown in the inset of FIG. 7, the content of aldehyde was similarly increased to that of carboxylate. Particularly, when the dosage of electron beam was less than 500 kGy, the content of aldehyde was hardly detected. When the irradiation dosage was increased and reached 500 kGy or up, the content of aldehyde was rapidly increased.

The introduction of carboxylate group into the cellulose nanocrystal by irradiating electron beam was the first attempt in the present invention. From the above results, it was confirmed that the content of carboxylate group can be regulated by electron beam irradiation.

Therefore, according to the preparation method of the present invention, the amorphous region of the cellulose can be destroyed only when the cellulose was irradiated at the dosage of at least 500 kGy. It is preferable to irradiate 500-2500 kGy to prepare the cellulose nanocrystal which can satisfy the conditions satisfying the conditions of the present invention (aspect ratio: 7-25, length 200-1000 nm).

As described hereinbefore, the cellulose nanocrystal prepared by the preparation method for non-acid-treated eco-friendly cellulose nanocrystal of the present invention is characterized by eco-friendliness compared with the cellulose nanocrystal prepared by the conventional acid hydrolysis method because the method of the invention does not use such a chemical as acid in the process, by saving the total process energy and by easiness in using side products. The final cellulose nanocrystal product exhibits greatly improved thermal stability.

The cellulose nanocrystal prepared by the preparation method of the present invention demonstrates similar or higher aspect ratio and yield and a significantly excellent thermal stability than the conventional cellulose nanocrystal prepared through acid hydrolysis even though it demonstrates similar crystallinity, so that it can be effectively used for the production of membranes, electrical and electronic parts, substrates, heat insulating materials, and reinforcing materials required for durability against heat.

INDUSTRIAL APPLICABILITY

The preparation method for non-acid-treated eco-friendly cellulose nanocrystal of the present invention is eco-friendly, compared with the conventional preparation method for cellulose nanocrystal based on acid-hydrolysis, is efficient due to the total energy saving process is easy to utilize side products; and is characterized by high yield to produce the target cellulose nanocrystal. The nanocrystal prepared according to the present invention exhibits equivalent or higher aspect ratio, yield and crystallinity than the cellulose nanocrystal prepared through acid hydrolysis, and has remarkably excellent thermal stability, so that it can be effectively used for the production of membranes, electrical and electronic parts, substrates, heat insulating materials, and reinforcing materials required for durability against heat.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

What is claimed is:

1. A method for preparing a non-acid-treated eco-friendly cellulose nanocrystal having a length of 200 to 1000 nm, an aspect ratio of 7 to 25, and a crystallinity index of 60 to 90% comprising the following steps:
   irradiating cellulosic materials with a dosage of radiation, wherein the dosage of radiation is 500 to 2,000 kGy (step 1); and
   homogenizing the irradiated cellulosic materials from step 1 (step 2),
   wherein the homogenization in step 2 is performed by using a homogenizer, and wherein a yield of the cellulose nanocrystal is 40 to 60%.

2. The method according to claim 1 further comprising a hot water extraction step after the irradiation step in step 1.

3. The method according to claim 2, wherein the hot water extraction step further comprises a neutralizing step or weak alkalizing step using an alkali solution.

4. The method according to claim 2, wherein the hot water extraction step further comprises a bleaching step using an oxidizing agent or a reducing agent.

5. The method according to claim 1, wherein the radiation is selected from the group consisting of electron beam radiation, alpha ray radiation, beta ray radiation, gamma ray radiation, ultraviolet ray radiation, X-ray radiation, plasma radiation and combinations thereof.

6. The method according to claim 1, wherein the cellulosic material is selected from the group consisting of microcrystalline cellulose; microbial cellulose;
cellulose derived from marine or invertebrate animals; wood pulp; non-wood pulp; regenerated cellulose; mercerised cellulose; cellulose derivatives; and combinations thereof.

7. The method according to claim 1, wherein the cellulose nanocrystal has a carboxylate(COO—) group introduced therein.

8. A method for extracting a cellulose nanocrystal having a length of 200 to 1000 nm, an aspect ratio of 7 to 25, and a crystallinity index of 60 to 90% from cellulosic materials comprising the following steps:
irradiating the cellulosic materials with a dosage of radiation, wherein the dosage of radiation is 500 to 2,000 kGy (step 1); and
homogenizing the irradiated cellulosic materials from step 1 (step 2),
wherein the homogenization in step 2 is performed by using a homogenizer, and wherein a yield of the cellulose nanocrystal is 40 to 60%.

* * * * *